United States Patent [19]
Bernhard et al.

[11] Patent Number: 5,184,792
[45] Date of Patent: Feb. 9, 1993

[54] SUPPORT CLIP FOR ELECTRICAL CABLES

[75] Inventors: James C. Bernhard, Austin; Thomas P. Johnson, Jonestown; Garth V. Antila, Austin, all of Tex.

[73] Assignee: Minnesota Mining and Manufacturing Company, St. Paul, Minn.

[21] Appl. No.: 776,985

[22] Filed: Oct. 15, 1991

[51] Int. Cl.$^5$ .............................................. F16B 15/00
[52] U.S. Cl. ..................................... 248/71; 248/74.5; 248/87
[58] Field of Search ............... 248/74.5, 71, 48.2, 248/67, 76, 87, 545–546, 156, 530; 411/920, 457, 470, 473, 475

[56] References Cited

U.S. PATENT DOCUMENTS

| | | | |
|---|---|---|---|
| 264,262 | 9/1882 | Draper, Jr. | 248/48.2 |
| 907,834 | 12/1908 | Marshall | 248/71 X |
| 1,087,264 | 2/1914 | Sheppard | 411/470 |
| 1,735,939 | 11/1929 | St. John | 248/71 |
| 2,140,862 | 12/1938 | Sumner | 248/156 |
| 2,323,362 | 7/1943 | Weiss | 411/470 X |
| 2,885,168 | 5/1959 | Silverman | 248/71 |
| 2,913,204 | 11/1959 | Stewart | 248/71 |
| 3,279,300 | 10/1966 | Larson | 248/71 X |

FOREIGN PATENT DOCUMENTS 175143  2/1922  United Kingdom ................. 248/71

*Primary Examiner*—Karen J. Chotokowski
*Attorney, Agent, or Firm*—Gary L. Griswold; Walter N. Kirn; David W. Anderson

[57] ABSTRACT

A cable support formed of sheet metal and including a body portion adapted to be driven into a structural member of a building and a U-shaped bracket extending from the body portion for retaining a cable.

7 Claims, 1 Drawing Sheet

SUPPORT CLIP FOR ELECTRICAL CABLES

TECHNICAL FIELD

The present invention relates generally to devices for retaining electrical cables and, in particular to devices for retaining and organizing household and commercial wiring.

BACKGROUND OF THE INVENTION

Electrical codes and good wiring practice require that electrical wiring within the walls of dwelling or commercial buildings be supported and restrained from movement so as to prevent contact by such things as construction fasteners driven into the walls and organized to allow easy identification and tracing. In the past, metal staples, with or without insulation, or staples in the form of molded plastic pieces with attached nails have been placed over the cables and nailed to the wooden framing members of the building to perform these functions. It is desirable to provide a device which will perform the required restraining, retaining and organizing functions at a reduced cost.

SUMMARY OF THE INVENTION

An inexpensively produced cable support is provided according to the present invention by a sheet of metal formed to include a body portion adapted to be driven into a building structural member and a generally U-shaped bracket including a base extending substantially perpendicular to the body, a first leg extending from one end of the base and defined by a portion of the body and a second leg extending from the other end of the base and substantially parallel to the first leg, with the body including a longitudinal bend to provide strength and resist bending of the body when the body is driven into the structural member. The bracket may be open either toward or away from the end of the body to be driven and, if open away from the driven end, may be formed by cutting the body longitudinally from the end to be driven into the structural member along a portion of its length and bending the metal sheet cut portion perpendicular to the body to form the bracket base and in a direction opposite the cut to form the second leg. A lip for retaining the cable within said bracket may be formed by cutting the body opposite the end to be driven into the structural member and bending the metal into the opening of the U-shaped bracket and a second lip may be formed at the end of the second leg by bending the end of the second leg into the opening of the bracket for further retaining the cable within the bracket.

The body preferably includes at least one point formed at the body end to facilitate driving the support into the structural member. This point may be formed by cutting the body end at an angle to its length. Alternatively, the entire width of the end may be sharpened to facilitate driving the support into the structural member.

In another embodiment, the support is formed by folding a substantially rectangular sheet of metal upon itself to produce the body of double sheet thickness and bending a portion of one thickness away from the other to form the bracket base and parallel to the body to form the second leg. This embodiment may also include a lip for retaining the cable within the bracket, and the body may be sharpened or pointed to facilitate driving the support into the structural member.

BRIEF DESCRIPTION OF THE DRAWINGS

The present invention will be described in greater detail with reference to the accompanying drawings, wherein like numbers refer to like parts in the several views, and wherein.

DESCRIPTION OF THE PREFERRED EMBODIMENTS

Figures 1, 2, 3:
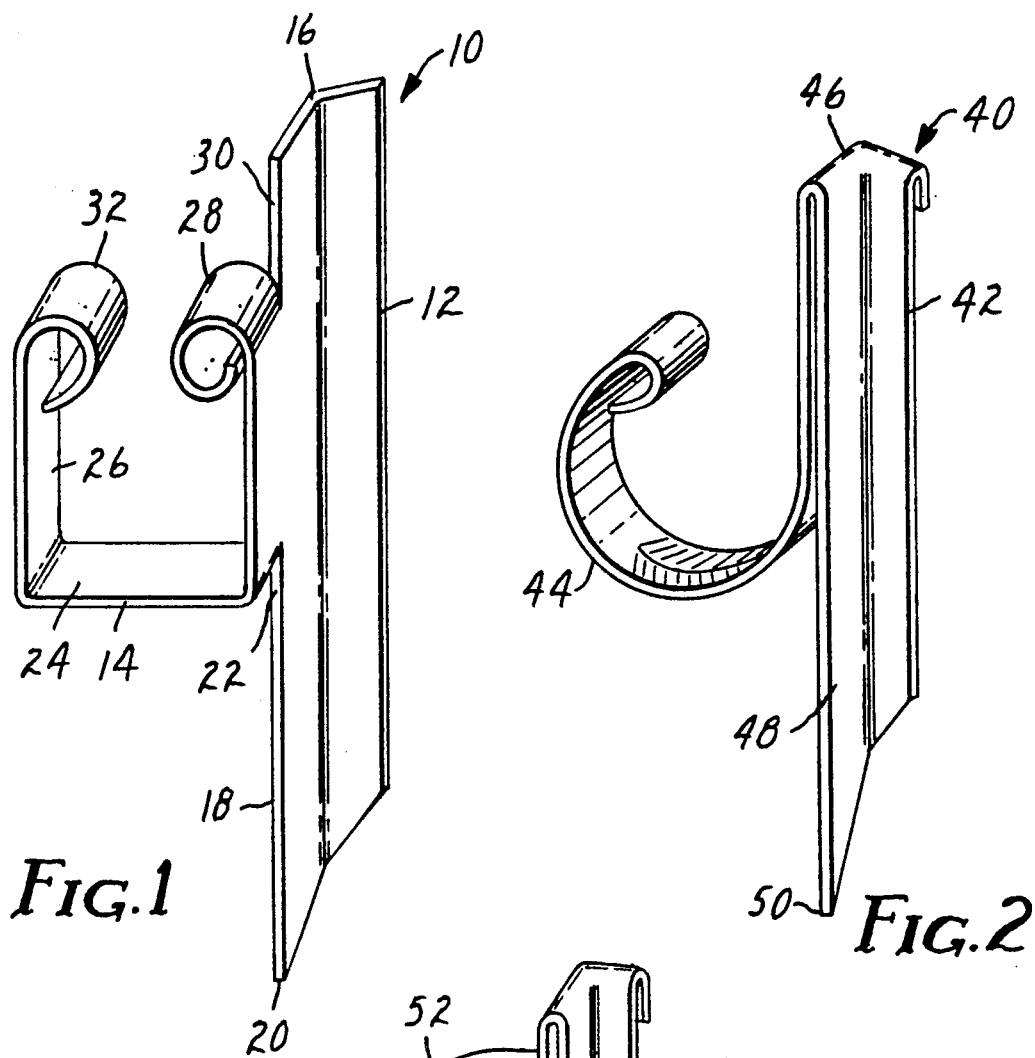
FIG. 1 is a perspective view of a cable support according to the present invention.
FIG. 2 is a perspective view of an alternate embodiment of a cable support according to the present invention.
FIG. 3 is a perspective view of a second alternate embodiment of a cable support according to the present invention.

FIG. 1 illustrates a cable support, generally indicated as 10, formed of sheet metal bent to define a body portion 12 and a U-shaped, cable-restraining bracket 14. The support 10 is designed to be driven into a structural member of a building such as a length of wood, and may be formed of any metal which has strength sufficient to resist deformation as it is driven. Preferable materials include steel or galvanized steel and appropriate dimensions for the flat blank from which the support 10 may be formed have been found to be approximately 0.75 mm thick, approximately 12 mm in width and approximately 75 mm in length. It will be recognized that wide variations in these dimensions will still result in a usable product. The dimensions given result in a support 10 which accomplishes its purpose while utilizing a minimum of material.

The body 12 of the support 10 illustrated in FIG. 1 includes a longitudinal bend 16 along its length which is provided to increase the rigidity of the body 12. This bend 16 may be a gradual curvature of the body 12 or may be a sharp fold and may be in either direction from the plane of the body 12. One end 18 of the body 12 is cut at an angle to the length of the body 12 to provide a point 20 which facilitates driving the support 10 into a building structural member. Alternatively, driving of the support 10 may be facilitated by sharpening the width of the body end 18 or cutting the end 18 of the body 12 to provide a series of points along the width of the body 12.

The bracket 14 is formed by slitting the body 12 along a longitudinal cut line 22 extending from the end 18 of the body 12 for a portion of its length. The cut portion of the body 12 is bent perpendicularly outward from the body 12 to form the base 24 of the U-shaped bracket 14, and the end of the cut portion is bent upward to form a second upstanding leg 26 of the U-shaped bracket. The first upstanding leg defining a portion of the bracket 14 is the uncut portion of the body 12 extending above the cut 22.

The support 10 may be provided with a lip or lips to capture the cable within the bracket 14. A lip 28 may be formed on the side of the bracket 14 adjacent the body 12 by slitting the body at a second cut line 30 and folding or curling the cut portion inwardly toward the open end of the U-shaped bracket 14. Curling of the lip 28 is preferred to prevent exposure of sharp metal to the cable. Another lip 32 may be formed by curling or folding the end of the second upstanding leg 26 inwardly.

In use, the support 10 is driven, as by a hammer, into a building structural member until the bracket base 24 contacts the structural member. An electrical or other cable (not shown) is either drawn through the bracket 14 or pushed into the opening of the bracket 14. The bracket 14 will yield to allow the cable to pass the lip or lips 28 and/or 32, and may be bent toward the body 12 after insertion of the cable to positively capture the cable.

FIG. 2 illustrates a second embodiment of a support 40 which includes a body portion 42 formed by folding a length of sheet metal substantially in half to form the body 42 as a double thickness of material. One thickness of the body 42 is bent away from the other and upwardly to form a U-shaped bracket 44 similar to the bracket 14 of FIG. 1. The remaining thickness of the body 42 includes longitudinal bend or fold 46 and the end 48 of the body 42 to be driven may include a point 50 or may be otherwise sharpened as described above. The bracket 44 of FIG. 2 illustrates features which may be incorporated into the support 10 of FIG. 1, namely, the bracket 44 is smoothly curved rather than sharply folded and the bracket 44 may be bent in its cross-section to increase its rigidity.

One advantage of the embodiment of FIG. 2 over that of FIG. 1 is that a reduced amount of material may be used and still produce a workable product because of the double thickness of the body portion 42. It has been found that a starting blank of sheet metal approximately 0.5 mm thick, approximately 5 mm wide and approximately 75 mm long produces an acceptable product. This material represents only about 27% the amount of material used in the embodiment of FIG. 1.

FIG. 3 illustrates that many variations of the invention described above are possible. In the embodiment of FIG. 3, the bracket 52 is formed as an inverted U-shape rather than the shape described above. However, the embodiment of FIG. 3 includes the same advantages and properties described above with respect to FIGS. 1 and 2. It should be recognized that additional variations are possible even though such are not illustrated. For example, one or more additional brackets may extend from the body of the cable support clip or from the bracket described to form a double cable-containing bracket. Such variation are intended to be included in the invention if they fall within the scope of the appended claims.

We claim:

1. A support for electrical cable adapted to be driven into a structural member, the support comprising a sheet of metal formed to include a body having a pointed end for penetration of the structural member and a generally U-shaped bracket including a base extending from the approximate midpoint of said body and substantially perpendicular to said body, a first leg extending from one end of said base and defined by an extension of said body opposite said pointed end and a second leg extending from the other end of said base in the direction away from said pointed end and substantially parallel to and substantially equisdistant with said first leg, said body including a logitudinal bend to provide strength and resist bending of said body when said body is driven into the structural member.

2. A support according to claim 1 wherein said bracket is formed by cutting said body from one end longitudinally along a portion of its length and bending the metal sheet cut portion perpendicular to said body to form said bracket base and in a direction opposite said cut to form said second leg.

3. A support according to claim 2 further including a lip formed by cutting said body opposite said one end and bending said metal into the opening of said U-shaped bracket to form said lip for retaining the cable within said bracket.

4. A support according to claim 3 further including a lip formed by cutting said body opposite said one end and bending said metal into the opening of said U-shaped bracket to form said lip for retaining the cable within said bracket.

5. A support according to claim 1 wherein said bracket is formed by cutting said body from one end longitudinally along a portion of its length and bending the metal sheet cut portion into a continuous curve away from said body portion.

6. A support according to claim 5 further including a lip formed by cutting said body opposite said one end and bending said metal into the opening of said U-shaped bracket to form said lip for retaining the cable within said bracket.

7. A support according to claim 6 further including a lip formed at the end of said second leg and extending into the opening of said bracket for retaining the cable within said bracket.

* * * * *